US012701071B2

(12) United States Patent
Bansal et al.

(10) Patent No.: US 12,701,071 B2
(45) Date of Patent: Aug. 4, 2026

(54) SYSTEMS AND METHODS FOR MANAGING PACKET LATENCY

(71) Applicant: Avago Technologies International Sales Pte. Limited, Singapore (SG)

(72) Inventors: Ankit Sajjan Kumar Bansal, Milpitas, CA (US); Manoj Lakshmy Gopalakrishnan, Santa Clara, CA (US); Vahid Tabatabaee, Potomac, MD (US); Rahul Durve, Cupertino, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 72 days.

(21) Appl. No.: 18/786,463

(22) Filed: Jul. 27, 2024

(65) Prior Publication Data

US 2026/0032076 A1     Jan. 29, 2026

(51) Int. Cl.
| | |
|---|---|
| *H04L 45/302* | (2022.01) |
| *G06F 12/08* | (2016.01) |
| *G06F 13/364* | (2006.01) |
| *G06F 15/16* | (2006.01) |
| *H04L 12/46* | (2006.01) |
| *H04L 12/863* | (2013.01) |
| *H04L 15/16* | (2006.01) |
| *H04L 45/12* | (2022.01) |
| *H04L 47/56* | (2022.01) |

(52) U.S. Cl.
CPC .......... *H04L 45/123* (2013.01); *H04L 45/302* (2013.01); *H04L 47/56* (2013.01)

(58) Field of Classification Search
CPC ...... H04L 45/123; H04L 45/302; H04L 47/56
USPC .......................................................... 709/238
See application file for complete search history.

(56) References Cited

U.S. PATENT DOCUMENTS

| | | | |
|---|---|---|---|
| 7,194,550 B1 * | 3/2007 | Chamdani ........... | H04L 67/1097 |
| | | | 709/227 |
| 10,257,117 B2 | 4/2019 | Kumar et al. | |
| 10,491,543 B1 * | 11/2019 | Wagh .................. | H04L 49/1523 |

(Continued)

FOREIGN PATENT DOCUMENTS

| | | | |
|---|---|---|---|
| WO | 2022132288 A1 | 6/2022 | |
| WO | WO-2023220483 A2 * | 11/2023 | ............. H04L 45/38 |

OTHER PUBLICATIONS

Partial European Search Report for Patent Application No. EP25191543.5 dated Dec. 10, 2025; 16 pages.

*Primary Examiner* — Berhanu Shitayewoldetsadik
(74) *Attorney, Agent, or Firm* — Quarles & Brady LLP

(57) ABSTRACT

A network switch includes an input port configured to receive a first data packet comprising a header of metadata and a payload of a plurality of cells. The network switch includes a controller configured to determine, using at least the metadata, an eligibility of directing the first data packet to a first path or otherwise directing the first data packet to a second path. The first path is characterized by a first latency. The second path is characterized by a second latency. The first latency is lower than the second latency. The network switch is configured to start storing the first data packet from the first path into a queue upon receiving a first cell of the payload, to manage the packet in the queue, to retrieve the cells from the queue to prepare a second data packet; and to transmit the second data packet upon identification of a destination port.

18 Claims, 4 Drawing Sheets

(56)        References Cited

U.S. PATENT DOCUMENTS

| | | | |
|---|---|---|---|
| 10,686,714 B2 * | 6/2020 | Fairhurst | H04L 49/3027 |
| 2006/0114902 A1 * | 6/2006 | Kalkunte | H04L 45/16 |
| | | | 370/389 |
| 2012/0057597 A1 * | 3/2012 | Oskouy | H04L 49/608 |
| | | | 370/392 |
| 2013/0286859 A1 * | 10/2013 | Wei | H04L 43/10 |
| | | | 370/244 |
| 2013/0322249 A1 * | 12/2013 | Heinz | H04L 45/24 |
| | | | 370/235 |
| 2016/0335283 A1 * | 11/2016 | Rabinovich | G06F 11/1448 |
| 2018/0062990 A1 * | 3/2018 | Kumar | H04L 45/26 |
| 2019/0334837 A1 * | 10/2019 | Fairhurst | H04L 49/9005 |
| 2020/0389386 A1 * | 12/2020 | Uscumlic | G06F 11/2007 |
| 2021/0297362 A1 * | 9/2021 | Eckert | H04L 47/32 |

* cited by examiner

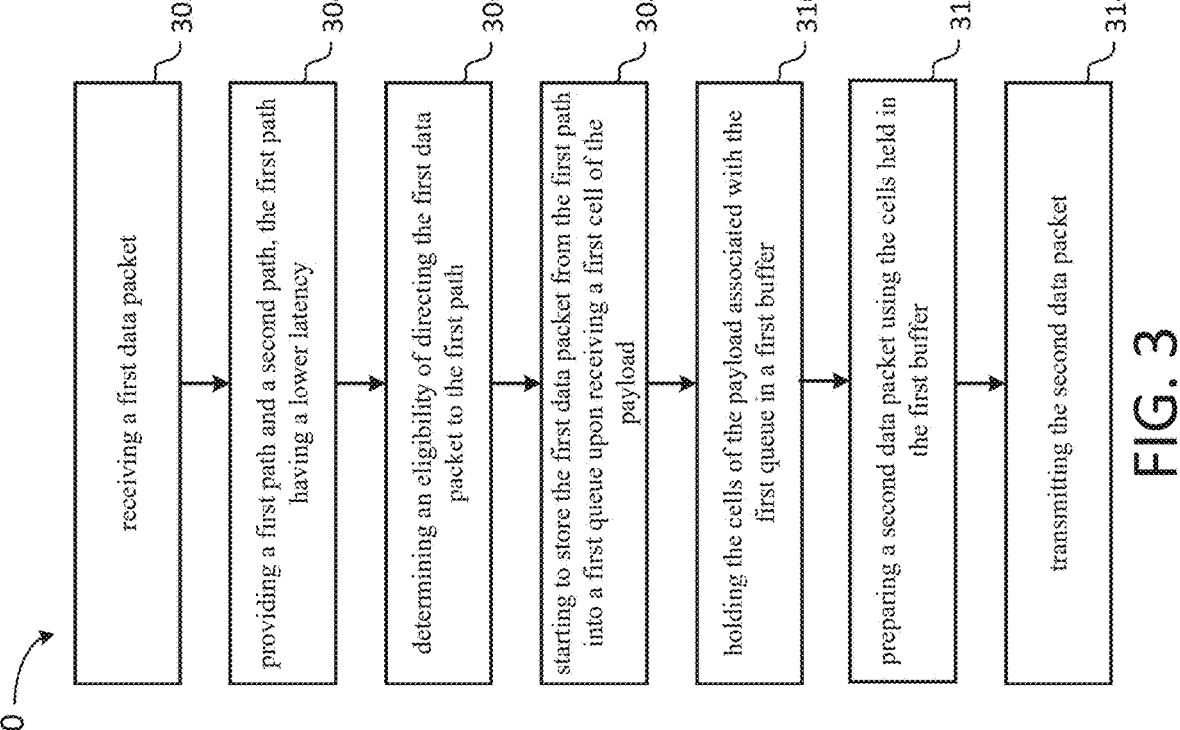

300

302 — receiving a first data packet

304 — providing a first path and a second path, the first path having a lower latency 306 — determining an eligibility of directing the first data packet to the first path 308 — starting to store the first data packet from the first path into a first queue upon receiving a first cell of the payload 310 — holding the cells of the payload associated with the first queue in a first buffer 312 — preparing a second data packet using the cells held in the first buffer 314 — transmitting the second data packet

FIG. 3

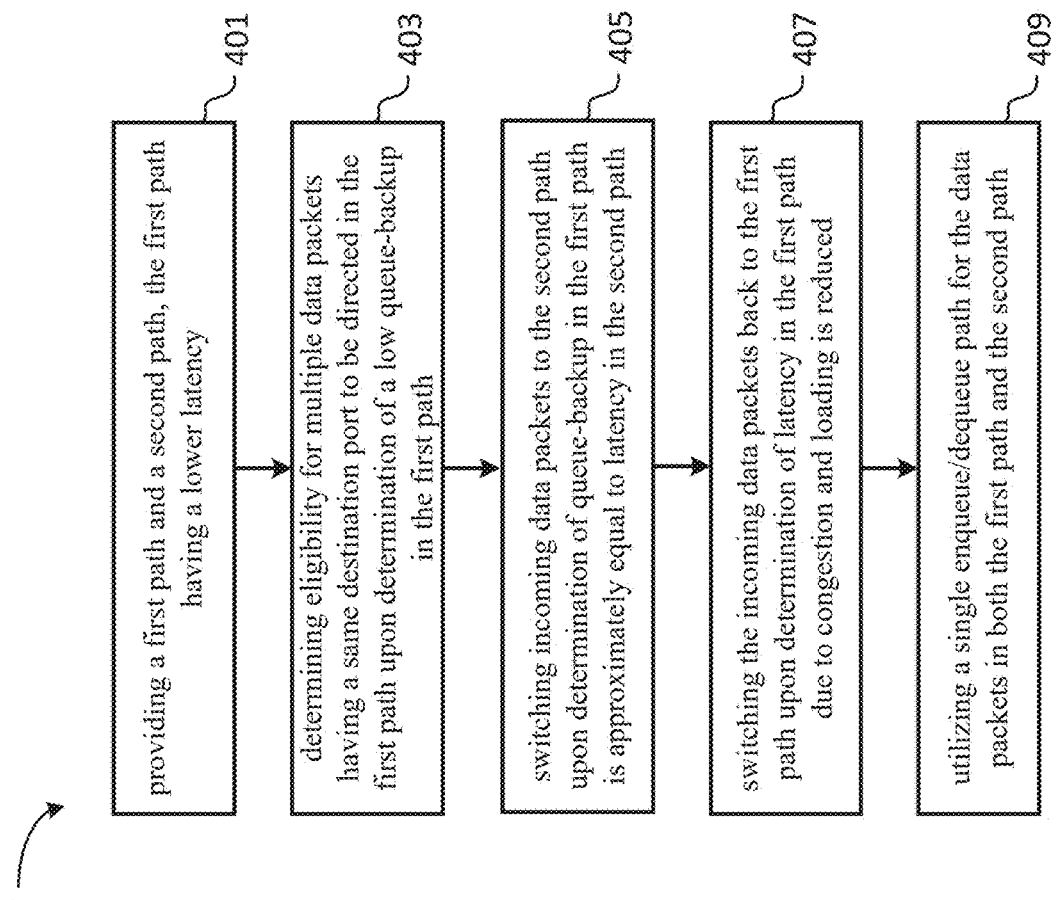

400

401 providing a first path and a second path, the first path having a lower latency 403 determining eligibility for multiple data packets having a same destination port to be directed in the first path upon determination of a low queue-backup in the first path 405 switching incoming data packets to the second path upon determination of queue-backup in the first path is approximately equal to latency in the second path 407 switching the incoming data packets back to the first path upon determination of latency in the first path due to congestion and loading is reduced 409 utilizing a single enqueue/dequeue path for the data packets in both the first path and the second path

FIG. 4

SYSTEMS AND METHODS FOR MANAGING PACKET LATENCY

FIELD OF INVENTION

The subject technology is directed to network switches and methods for network traffic management.

BACKGROUND OF THE INVENTION

In Ethernet network switches, packet handling is often performed using a store-and-forward (SAF) approach, which may involve receiving the entire packet and ensuring its integrity before any switching actions are initiated. Consequently, packet switching begins after the end-of-packet (EOP) has arrived at the switch, leading to higher latency in the packet processing pipeline. To address the latency issues inherent in the SAF approach, it is desirable to have an improved network switch with a feature of cut-through switching to allow the packet to be switched to the destination port upon the start-of-packet (SOP) arrival. Also, it is desired to have a low-latency packet processing that parallelizes or bypasses cell switching latency when possible.

BRIEF DESCRIPTION OF THE DRAWINGS

A further understanding of the nature and advantages of particular embodiments may be realized by reference to the remaining portions of the specification and the drawings, in which reference numerals are used to refer to similar components. In some instances, a sub-label is associated with a reference numeral to denote one of multiple similar components. When reference is made to a reference numeral without specification of an existing sub-label, it is intended to refer to all such multiple similar components.

FIG. 3 is a flow chart illustrating a method for managing packet latency in a traffic manager according to an embodiment of the subject technology.

FIG. 4 is a flow chart illustrating a method for managing packet latency in a traffic manager according to another embodiment of the subject technology.

DETAILED DESCRIPTION OF THE INVENTION

Figure 1:
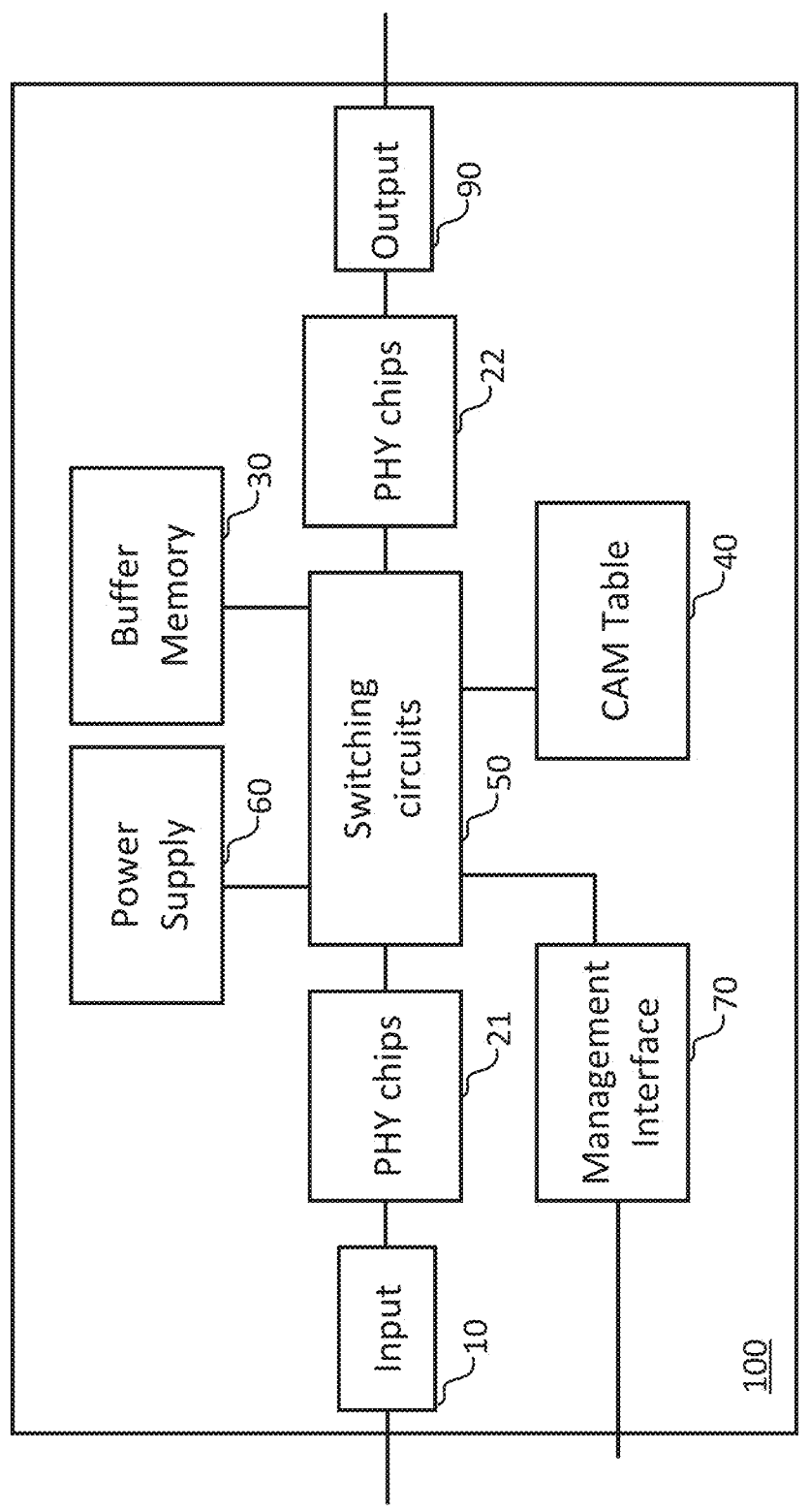
FIG. 1 is a simplified block diagram of a network switch according to embodiments of the subject technology.

A network switch includes a traffic manager (TM) configured to initiate a low-latency (LL) path with an LL packet process to bypass one or more processes in a store-and-forward path for switching a packet as soon as a destination port is identified. The network switch includes an enqueue/dequeue path configured to start storing the packet in a queue while cells of the packet arrive at the TM if the packet passes an LL eligibility check. There are many other embodiments as well.

A packet, also referred to herein as a data packet, is a unit of data used in network communications, containing both payload and control information for its delivery. For example, packets include, for instance, frames, datagrams, and network layer packets. In certain networking technologies, particularly those using Asynchronous Transfer Mode (ATM) or similar protocols, packets are divided into smaller fixed-size units called cells for more efficient handling. Cells contain parts of the packet's payload and their control information to ensure proper routing and reassembly into the original packet at the destination. This fragmentation allows for more efficient and predictable handling of data, especially in high-speed networks. A large data packet is created by an application. This packet is divided into smaller cells by the sender's network hardware or software. The cells can be transmitted individually across the network. Each cell can take a different path to the destination depending on the network's current state. At the receiving end, the network hardware or software reassembles the cells back into the original packet using the control information in the headers of the cells. The complete packet is then delivered to the receiving application at a destination port.

Store-and-forward (SAF) packet processing in the network needs to receive all cells in the entire packet before any switching actions are initiated. Consequently, packet switching begins only after the end-of-packet (EOP) has arrived at the switch, leading to higher latency in the packet processing pipeline. To address the latency issues inherent in the SAF approach, it is highly desirable to implement a low-latency (LL) path within the switch. This LL path would enable packet switching to commence upon the arrival of the start-of-packet (SOP) cell, significantly reducing the overall latency. Furthermore, this LL path can bypass or parallelize cell switching latency wherever possible, ensuring the switch operates efficiently and quickly.

However, maintaining the performance and resilience of the LL path poses challenges, particularly in scenarios where there are simultaneous packets from multiple source ports targeting the same destination port, or when auxiliary ports (such as CPU, management, or loopback ports) send traffic to that destination port. These situations can lead to undesirable transitions from the LL path to the SAF state, increasing latency.

The following description is presented to enable one of ordinary skill in the art to make and use the invention and to incorporate it in the context of particular applications. Various modifications, as well as a variety of uses in different applications, will be readily apparent to those skilled in the art, and the general principles defined herein may be applied to a wide range of embodiments. Thus, the present invention is not intended to be limited to the embodiments presented but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent, or similar purpose unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

When an element is referred to herein as being "connected" or "coupled" to another element (which may include electrical or communicative connecting or coupling for data transmission purposes), it is to be understood that the elements can be directly connected to the other element, or have intervening elements present between the elements. In contrast, when an element is referred to as being "directly connected" or "directly coupled" to another element, it should be understood that no intervening elements are present in the "direct" connection between the elements. However, the existence of a direct connection does not exclude other connections, in which intervening elements may be present.

Moreover, the terms left, right, front, back, top, bottom, forward, reverse, clockwise, and counterclockwise are used for purposes of explanation only and are not limited to any fixed direction or orientation. Rather, they are used merely to indicate relative locations and/or directions between various parts of an object and/or components.

Furthermore, the methods and processes described herein may be described in a particular order for ease of description. However, it should be understood that, unless the context dictates otherwise, intervening processes may take place before and/or after any portion of the described process, and further various procedures may be reordered, added, and/or omitted in accordance with various embodiments.

Unless otherwise indicated, all numbers used herein to express quantities, dimensions, and so forth should be understood as being modified in all instances by the term "about." In this application, the use of the singular includes the plural unless specifically stated otherwise, and the use of the terms "and" and "or" means "and/or" unless otherwise indicated. Moreover, the use of the terms "including" and "having," as well as other forms, such as "includes," "included," "has," "have," and "had," should be considered non-exclusive. Also, terms such as "element" or "component" encompass both elements and components comprising one unit and elements and components that comprise more than one unit, unless specifically stated otherwise.

As used herein, the phrase "at least one of" preceding a series of items, with the term "and" or "or" to separate any of the items, modifies the list as a whole, rather than each member of the list (i.e., each item). The phrase "at least one of" does not require the selection of at least one of each item listed; rather, the phrase allows a meaning that includes at least one of any one of the items, and/or at least one of any combination of the items. By way of example, the phrases "at least one of A, B, and C" or "at least one of A, B, or C" each refer to only A, only B, or only C; and/or any combination of A, B, and C. In instances where it is intended that a selection be of "at least one of each of A, B, and C," or alternatively, "at least one of A, at least one of B, and at least one of C," it is expressly described as such.

One general aspect of the subject technology includes a network switch. The network switch includes an input port configured to receive a first data packet. The first data packet may include a header and a payload. The header may include a metadata. The payload may include a plurality of cells. The switch also includes a controller configured to determine, using at least the metadata, an eligibility of directing the first data packet to a first path or otherwise directing the first data packet to a second path, the first path being characterized by a first latency, the second path being characterized by a second latency, the first latency being lower than the second latency. The switch also includes a first processor configured to start storing the first data packet from the first path into a first queue upon receiving a first cell of the payload. The switch also includes a first buffer configured in the first path to hold the cells of the payload associated with the queue. The switch also includes a second processor configured to manage the first data packet in the first queue. The switch also includes a third processor configured to retrieve the cells from the queue to prepare a second data packet. The switch also includes an output port configured to transmit the second data packet upon identification of a destination port. Other embodiments of this aspect include corresponding network systems, apparatus, and computer programs recorded on one or more computer storage devices, each configured to perform the actions of the methods.

Implementations of the network switch may include one or more of the following features. The network switch may include a fourth processor configured in the second path to accumulate all cells of the first data packet over a first delay before forwarding the first data packet to the first processor to be enqueued in a second queue. The fourth processor is further configured to process the cells of the payload with a second delay and hold the cells in a second buffer. The first buffer may include a smaller size than the second buffer, resulting in a faster access time in the first path. The controller may include admission control counters coupled to the first processor for accounting for data packets in the first path and the second path. The controller is configured to: determine the eligibility for packets in a destination queue to take the first path when queue backup is lower than a predetermined level; determine the first latency due to the queue backup is approximately equal to the second latency to direct the packets to the second path; determine the first latency due to the queue backup being reduced to switch the packets back to the first path. The first processor, the second processor, and the third processor are utilized as a single enqueue/dequeue path for packets in both the first path and the second path. The network switch may include a quality of service (QoS) scheduler coupled to the second processor and configured to select packets from both the first path and the second path to dequeue in the single enqueue/dequeue path, thereby maintaining QoS requirements across queues. The controller is further configured to keep packets in the first path when multiple source ports send the packets to a given destination port no matter whether the packets are sent from front panel ports or auxiliary ports. The controller is further configured to: track selections of data packets into the first path at a queue level; allow higher-priority queues of a port with lower queue backup in the second path to be switched to the first path even if lower-priority queues of the same port experience higher queue backup; and restrict lower-priority queues from using the first path if higher-priority queues cannot use the first path. Implementations of the described techniques may include hardware, a method or process, or computer software on a computer-accessible medium.

Another general aspect of the subject technology includes a method for managing network traffic to reduce latency. The method also includes receiving a first data packet. The first data packet may include a header and a payload. The header may include metadata. The payload may include a plurality of cells. The method also includes providing a first path and a second path, the first path being characterized by a first latency, the second path being characterized by a second latency, the first latency being lower than the second latency.

The method also includes determining, using at least the metadata, an eligibility of directing the first data packet to the first path or otherwise directing the first data packet to the second path. The method also includes starting to store the first data packet from the first path into a first queue upon receiving a first cell of the payload. The method also includes holding the cells of the payload associated with the first queue in a first buffer. The method also includes preparing a second data packet using the cells held in the first buffer. The method also includes transmitting the second data packet. Other embodiments of this aspect include corresponding computer systems, apparatus, and computer programs recorded on one or more computer storage devices, each configured to perform the actions of the methods.

Implementations may include one or more of the following features. The method may include: accumulating all cells of the first data packet in the second path over a first delay before storing the first data packet in a second queue and holding the cells of the payload in a second buffer, where the first delay is bypassed by the first data packet in the first path; and processing the cells of the payload with a second delay and holding the cells in a second buffer, where the second delay is bypassed by the first data packet in the first path. The first buffer may include a smaller size than the second buffer, resulting in a faster access time in the first path. Implementations of the described techniques may include hardware, a method or process, or computer software on a computer-accessible medium.

Yet another general aspect of the subject technology includes a method for managing network traffic. The method also includes providing a first path and a second path, the first path being characterized by a first latency, the second path being characterized by a second latency, the first latency being lower than the second latency. The method also includes determining eligibility for multiple data packets having a same destination port to be directed in the first path upon determination of the first latency due to low queue backup in the first path. The method also includes switching incoming data packets to the second path upon determination of the first latency due to high queue backup in the first path is approximately equal to the second latency. The method also includes switching the incoming data packets back to the first path upon determination of the first latency due to congestion and loading is reduced. The method also includes utilizing a single enqueue/dequeue path for the data packets in both the first path and the second path. The method may include selecting data packets from both the first path and the second path for dequeue by a quality of service (QoS) scheduler, thereby maintaining QoS requirements across queues. The method may include accounting for the network traffic in both the first path and the second path using admission control counters, thereby eliminating the need for allocating additional buffers for the first path. The method may include allowing the data packets to stay in the first path upon determination of the data packets to a given destination port being sent from multiple source ports no matter whether they are front panel ports or auxiliary ports. The method may include tracking a selection of data packets into the first path at a queue level. The method may include allowing higher-priority queues of a port with lower queue backup in the second path to switch to the first path even if lower-priority queues of the same port experience higher queue backup. The method may include restricting lower-priority queues from using the first path if higher-priority queues cannot use the first path.

FIG. 1 presents a simplified block diagram of a network switch according to embodiments of the subject technology. This diagram serves as an example and should not unduly limit the scope of the claims. Those skilled in the art will recognize many variations, alternatives, and modifications. In one embodiment, network switch 100 includes several hardware components for managing network traffic. These components include an input port 10 and an output port 90, which are the physical connectors on the switch where devices connect via cables like Ethernet. The number of ports can vary depending on the switch's model and purpose.

Network switch 100 also features Physical Layer (PHY) chips 21 and 22, which handle the physical reception and transmission of data signals over network cables. These chips convert digital data from devices into electrical signals suitable for the cables and vice versa. Additionally, the network switch includes switching circuits 50, which serve as the brain of the switch, comprising controllers and processors that manage and process data packets, determining their efficient routing. As an example, the term "controller" refers to a hardware and/or software component responsible for various tasks, such as managing, directing, and regulating the flow of data packets, and others. As an example, a network switch may be a device that manages data traffic within a network by receiving, processing, and forwarding data packets to their intended destinations. It typically includes components for storing address information, temporary data storage, and controlling packet flow. Additionally, it may have a power supply and interfaces for configuration and monitoring. Network switches are used to optimize data transmission, reduce congestion, and enhance network performance, and can be implemented using various hardware and software configurations. Depending on the implementation, network switches can be configured differently to perform various functions.

These switching circuits can be implemented using specialized chips, such as application-specific integrated circuits (ASICs) and field-programmable gate arrays (FPGAs), designed for high-performance packet switching. Upon receiving incoming data packets via PHY chip 21 from input port 10, these circuits read the destination addresses (MAC addresses) within the packets, consult a content-addressable memory (CAM) table 40, and direct the packets to PHY chip 22 to transmit them out through output port 90. In some embodiments, the switching circuits 50 can be configured as a traffic manager to manage and process data packets, ensuring they are switched to the appropriate destination port.

Referring to FIG. 1, network switch 100 includes a CAM table 40, a high-speed memory that stores the MAC addresses of all devices connected through the switch's ports. When the network switch receives a packet, it searches the CAM table 40 for the destination MAC address to determine the appropriate destination port. Network switch 100 also features a buffer memory 30, which serves as temporary storage for incoming data packets while the switching circuits 50 decide on the outgoing port. This buffer memory helps manage traffic flow and prevents data loss during peak network activity.

Additionally, network switch 100 includes a power supply unit 60, which provides power to all the other components in the switch. Typically, network switch 100 also includes a management interface 70. The management interface 70 can be a console port, a dedicated management port, or a web interface, allowing network administrators to configure and monitor the switch's operation.

Figure 2:
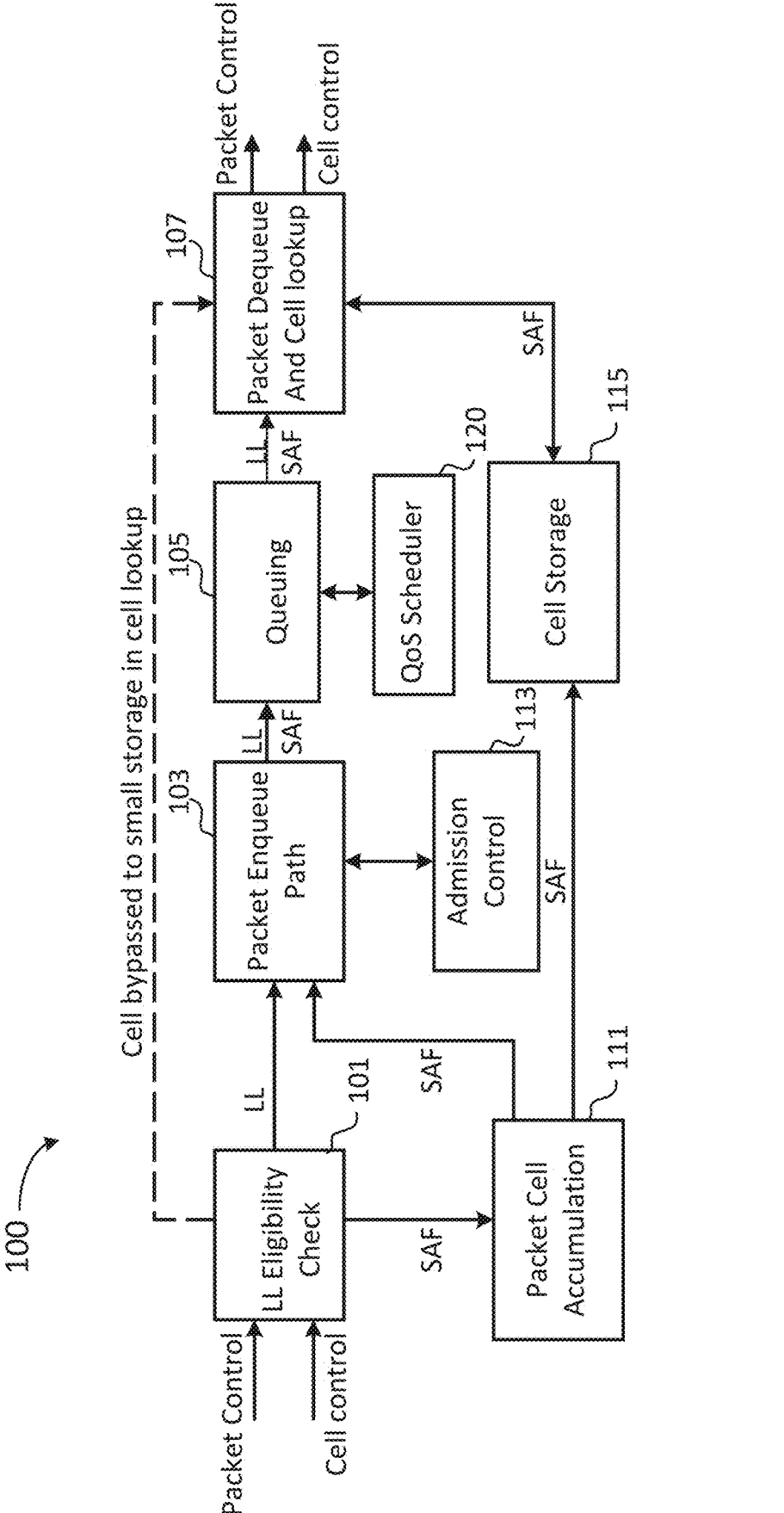
FIG. 2 is a functional diagram of a network switch for low-latency network traffic management according to embodiments of the subject technology.

FIG. 2 is a functional block diagram of a network switch designed for low-latency network traffic management according to embodiments of the subject technology. This diagram serves as an example and should not unduly limit the scope of the claims. Those skilled in the art will recognize many variations, alternatives, and modifications.

In one embodiment, network switch 100 is depicted in a functional block diagram of a traffic manager (TM) that provides two paths for network traffic management: a first path for executing data packets with lower latency (LL) and a second path for processing store-and-forward (SAF) packets. As an example, the first path, also referred to as the LL path, is characterized by lower latency compared to the SAF path, which has higher latency.

The term "traffic manager" or "TM" refers to a network function or tool that manages network traffic flows and is often implemented as part of a network switch. Depending on the implementation, a traffic manager may be realized through a combination of network hardware and software. For example, the TM in network switch 100 may be implemented using switching circuits 50, which manage the flow of packets through the switch, ensuring efficient and orderly processing, and maintaining QoS across diverse traffic types.

To initiate the LL path and reduce the latency associated with the SAF path for both packet control and cell control, the TM includes the following functional blocks: an LL eligibility check block 101, a packet enqueue path block 103, a queuing block 105, and a packet dequeue and cell lookup block 107. These blocks work together to ensure that high-priority traffic is processed with minimal delay, optimizing network performance and reliability. In the context of this application, for example, the term "eligibility" broadly refers to the criteria or conditions that a data packet must meet to be processed in a particular manner within the network switch.

The TM uses the LL eligibility check block 101 to initiate the packet processing by classifying incoming packets based on their headers, priorities, and QoS requirements. Block 101 can be implemented using various hardware components such as a microprocessor, an application-specific integrated circuit (ASIC), a controller (logic circuit), or other similar devices. In one embodiment, block 101 may function as a controller circuit within the switching circuits 50 of network switch 100, coupled to a PHY chip 21 to receive incoming data packets from an input port 10, as shown in FIG. 1.

In various embodiments, block 101 performs an eligibility check process to determine whether packets are eligible for the LL path by evaluating packet control information upon arrival at the TM. The eligibility check may use one or more predetermined criteria depending on the implementation.

The packet control information refers to the metadata and auxiliary data associated with a packet, facilitating its proper handling, routing, and delivery within a network. This information may include, for instance, various headers, trailers, and control signals that provide details about the packet's origin, destination, priority, and required processing actions. For instance, it may encompass header information such as source and destination address to indicate the sender and receiver of the packet, protocol information to identify the type of protocol used (e.g., TCP, UDP, ICMP), and QoS parameters to define the priority and handling requirements for the packet. Additionally, it includes information about packet fragmentation (cells) and reassembly.

The packet control information also includes control signals such as routing instructions, error-checking codes, and flow control signals. Furthermore, it may contain additional metadata like timestamps to indicate when the packet was generated or transmitted, sequence numbers to maintain the order of packets, especially in fragmented transmissions, and security information such as encryption details, authentication tags, and other security-related data.

By leveraging the LL eligibility check block 101, the TM ensures that high-priority and time-sensitive traffic is quickly identified and routed through the appropriate low-latency path, optimizing network performance and reliability.

The packet enqueue path block 103, or simply referred to as enqueue block 103, which in an implementation acts as the first point of contact for incoming data traffic. For example, enqueue block 103 may be implemented using various hardware components such as a microprocessor, an application specific integrated circuit, or others. In an embodiment, enqueue block 103 may be provided as one processor circuit of the switching circuits 50 of the network switch 100 of FIG. 1. The processor circuit is configured to provide enqueue processing for the incoming data packets including the data packet in the LL path directed from block 101 after the packet passes the eligibility check.

Each data packet is divided into smaller units called cells. The enqueue block 103 is responsible for handling the initial stages of packet processing by placing incoming packets or cells into appropriate queues based on their priority and QoS requirements. This ensures they are ready for subsequent processing stages. Enqueue block 103 can receive data packets or cells from various sources such as other network devices, computers, or servers.

The enqueue block 103 is designed to start storing the packet into a queue as the cells of the packet arrive, without needing to wait for the arrival of all cells of the entire packet, provided the packet passes the eligibility check. This means that once a packet is allowed to enter the LL path for low-latency processing, it initiates a start-of-packet (SOP) process, storing the cells of the LL packet into a queue upon the reception of the first cell.

If the packet does not pass the LL eligibility check, it is sent to the SAF path, where it is first directed to the packet cell accumulation block 111. Here, the cells of the packet are stored until the entire packet is received. The packet cell accumulation block 111 can be implemented using various hardware components such as a microprocessor, an application-specific integrated circuit, or other devices. In one embodiment, the packet cell accumulation block 111 functions as a processor circuit within the switching circuits 50 of network switch 100, as depicted in FIG. 1.

Once the SAF packet is fully received, it is reassembled, validated, and checked for errors in the packet cell accumulation block 111. After this process, the SAF packet is forwarded to the enqueue block 103, where it is enqueued in a second queue. This is referred to as the end-of-packet (EOP) process for the SAF packet.

In an embodiment, there is a single enqueue/dequeue path, and the enqueue block 103 handles the enqueue processing for both LL packets and SAF packets. This unified approach ensures efficient and orderly management of all network traffic, maintaining optimal performance and reliability.

The next stage is the queuing block 105, which manages the temporary storage, prioritization, and scheduling of packets. Queuing block 105 can be implemented using various hardware components, such as a microprocessor, an application-specific integrated circuit, or other devices. In one embodiment, queuing block 105 functions as a processor circuit within the switching circuits 50 of network switch 100, as shown in FIG. 1.

By maintaining multiple queues, applying scheduling algorithms, enforcing traffic shaping and policing policies, managing congestion, and/or controlling latency, the queuing block can help provide efficient traffic flow and maintains QoS requirements for diverse types of network traffic. In this embodiment, queuing block 105 is part of the single enqueue/dequeue path, managing how both LL packets and SAF packets are stored, prioritized, and processed before being forwarded to their next destination.

Queuing block 105 manages multiple queues that temporarily store packets in a buffer while they wait to be processed or forwarded. This block ensures packets are stored in an orderly manner and implements various queuing disciplines, such as FIFO (First-In-First-Out), priority queuing, and weighted fair queuing. By doing so, it ensures that packets are processed according to their priority and QoS requirements, optimizing the overall performance and reliability of the network switch.

The packet dequeue and cell lookup block 107, or simply referred to as dequeue block 107, is responsible for dequeuing packets, whether they are LL packets or SAF packets, from the queues for transmission by retrieving cells from the storage buffer. Dequeue block 107 can be implemented using various hardware components such as a microprocessor, an application-specific integrated circuit, or other devices. In one embodiment, dequeue block 107 functions as a processor circuit within the switching circuits 50 of network switch 100, as depicted in FIG. 1.

Dequeue block 107 also performs cell lookup operations to determine the next-hop destination and any necessary routing or forwarding actions. This ensures packets are forwarded according to network policies and routing tables. The LL path allows for faster packet processing by immediately enqueuing or dequeuing packets upon the arrival of the SOP cell. This minimizes delay for time-sensitive traffic, ensuring high-priority packets receive expedited treatment.

The TM retains the second path, known as the SAF path, for processing packets that fail the LL eligibility check. In this embodiment, the TM includes the packet cell accumulation block 111, which is configured to perform SAF packet switching, requiring the entire packet to be received before processing. The packet cell accumulation block 111 can be implemented as a processor circuit within the switching circuits 50 of network switch 100, as depicted in FIG. 1.

This block accumulates cells into complete packets. It ensures that all cells of a packet are received, reassembled, and validated before forwarding. Block 111 introduces a packet serialization delay, as it waits for all cells of the packet to arrive before enqueuing through the enqueue block 103.

Packet serialization delay refers to the time required to convert a packet or group of cells from their internal representation within a network device into a serial bit stream for transmission over a physical link. This delay is inherently associated with the process of transmitting data over a network and is influenced by the data rate of the output link. The packet serialization delay is a fundamental latency associated with SAF processing, which is bypassed by the LL path initiated in this TM.

In addition, block 111 is configured to introduce a cell-control processing delay used for processing all cells of the packet. The cell-control processing delay refers to the time taken to manage and coordinate the cells within the packet-switching environment. This delay encompasses the entire duration from when a cell enters the cell accumulation block until it is processed and ready for forwarding or transmission. For example, block 111 extracts and interprets the control information from each cell's header, which typically includes sequence numbers, cell type, and any other relevant metadata. It checks the sequence numbers of incoming cells to ensure they are received in the correct order. If cells are received out of order, the block may need to reorder them before reassembly. Also, block 111 may perform error detection and correction based on control information in the cells. This could include checking for missing cells or correcting errors using redundancy data included in the cells. During transmission, large packets are divided into smaller cells to accommodate network protocols and improve transmission efficiency. The packet cell accumulation block 111 collects all these cells and reassembles them to form the complete original packet before transmitting the packet into enqueue block 103. This cell-control processing ensures that the cells in the incoming packet are correctly reassembled into a complete packet before enqueuing in enqueue block 103. By initiating the LL path, packet processing through the LL path will bypass the cell-control processing delay.

Furthermore, the TM includes an admission control block 113 coupled to the enqueue block 103. It is configured to determine whether incoming packets in either the LL path or the SAF path can be accommodated based on current network conditions and resource availability. The admission control block 113 can be implemented using various hardware components such as a microprocessor, an application-specific integrated circuit (ASIC), a control logic circuit, or other devices. In one embodiment, the admission control block 113 functions as another control circuit within the switching circuits 50 of network switch 100, as shown in FIG. 1.

The admission control block 113 in a network switch manages network resources to provide efficient and reliable network operation. It may be configured to perform functions such as monitoring resource usage, evaluating incoming traffic, making admission decisions, enforcing QoS and network policies, managing congestion, dynamically adapting to changing conditions, and/or providing feedback and reporting. These functions help maintain optimal network performance and service quality.

In one embodiment, the admission control block 113 is configured to use admission control counters to track the usage of buffer space by both LL and SAF traffic. This unified accounting approach ensures that all traffic, regardless of type, is counted against the same pool of resources, thereby streamlining buffer management and optimizing resource utilization. As an example, admission control counters are configured to monitor the volume and types of data packets being processed, ensuring that the network operates efficiently and within its capacity limits, while maintaining the desired QoS.

In some embodiments, the admission control block 113 provides comprehensive admission control functions in the network switch 100. These functions are designed to manage network resources and ensure that traffic conforms to the network's QoS policies. They can be used for maintaining network performance, preventing congestion, and ensuring fair resource allocation. However, to enhance the performance of the LL path in network switch 100, some of these functions can be bypassed or simplified to reduce processing time and improve latency.

The goal is to minimize the processing time and complexity associated with full-fledged admission control. Below are some functions that can be bypassed or simplified for the LL path:

1. Simplified Resource Allocation: Instead of detailed resource allocation, the LL path may use pre-allocated resources or a simpler reservation mechanism to expedite the process.

2. Bypassing Strict Traffic Policing: The LL path may bypass strict traffic policing to avoid delays introduced by rate enforcement and measurements, thereby reducing latency.

3. Simplified Admission Decisions: Admission decisions for the LL path can be made using simplified criteria, such as only allowing high-priority traffic or flows below a certain bandwidth threshold.

4. Streamlined Buffer Management: The LL path may use a smaller, less complex buffer management strategy, assuming sufficient buffer availability for high-priority traffic.

By implementing these simplifications, the admission control block 113 can manage the LL path with reduced processing time, thereby enhancing network performance for latency-sensitive traffic.

In an embodiment, the admission control block 113 is configured to provide counters for accounting for both the LL path and SAF path traffic to ensure that no additional buffer is needed to be specially relocated for the LL traffic. The admission control block 113 continuously monitors the usage of network resources, such as bandwidth and buffer space, by both LL and SAF traffic. It uses counters to keep an accurate tally of the resources consumed by each type of traffic. By maintaining a unified set of counters for LL and SAF paths, the admission control block 113 can accurately reflect the total resource usage. The counters help ensure that the total buffer usage by LL and SAF traffic does not exceed the available capacity. By using a unified set of counters, the switch can make more efficient use of its resources, dynamically allocating buffer space based on current demand. There is no need for complex buffer management schemes that separate LL and SAF traffic, simplifying the overall management of network resources, maintaining high performance and low latency for critical traffic flows, and reducing congestion and packet loss.

Furthermore, the TM includes a cell storage block 115, which is coupled to the dequeue block 107 and the packet cell accumulation block 111. It is configured to store packet cells in memory and reassemble them into complete packets for traffic in the SAF path. In one embodiment, the cell storage block 115 is implemented as the buffer memory 30 of network switch 100, as depicted in FIG. 1. The cell storage block 115 provides temporary buffering for incoming cells until the entire packet is received.

Each packet is divided into smaller units called cells, and these cells are stored in the cell storage memory until all parts of the packet have arrived. Once all the constituent cells are received, they are retrieved from the memory and reassembled into complete packets. This involves combining the cells in the correct order to reconstruct the original packet. The cell storage block 115 performs various other functions essential to the SAF packet process. One key challenge is that accessing the memory for storing and retrieving packet cells can introduce significant delays, contributing to SAF latency.

In an embodiment, the TM in network switch 100 allows cells of the packet in the LL path to be stored in a first buffer, which is a small-sized, fast-access storage buffer, compared to the larger cell storage block 115. This smaller first buffer may be implemented within the dequeue block 107 and serves as a local buffer to hold cells temporarily. Accessing this smaller, local storage buffer is faster than accessing the larger, centralized cell storage memory.

By temporarily holding cells in a smaller, faster-access storage buffer, the network switch can reduce the overall latency involved in processing and forwarding packets. Using this fast-access storage buffer for cells in the LL path also addresses the traditional issue of requiring an additional separate storage block for LL cells and ensures that QoS can be maintained across both traffic streams. This unified approach improves efficiency and performance, allowing the network switch to handle high-priority traffic with minimal delay. For example, the term quality of service (QoS) refers to the set of techniques and policies used to manage and prioritize network traffic to ensure the efficient and reliable delivery of data packets.

Moreover, the TM is configured to utilize a single enqueue/dequeue path, incorporating the enqueue block 103, queuing block 105, and dequeue block 107, for packets selected in both the LL path and the SAF path. In one embodiment, the TM includes a QoS scheduler 120 configured to manage and prioritize network traffic based on predefined QoS policies. The QoS scheduler 120 selects packets in the enqueue/dequeue path for traffic in both the LL path and the SAF path, and manages packets in both ingress (input) and egress (output) queues based on their priority and QoS requirements, thereby maintaining QoS across all queues. As an example, the term "scheduler" refers to component or system responsible for managing and organizing tasks or processes within a network or computing environment. For example, a schedule may determine the order and priority in which tasks are executed, ensuring efficient resource utilization and performance. In the context of network traffic management, a scheduler may manage the timing and prioritization of data packets, balancing load and optimizing throughput while minimizing latency and congestion. Schedulers can be implemented in various hardware and software configurations and are essential for maintaining the smooth operation of network services and applications.

The QoS scheduler 120 ensures that high-priority traffic is processed and transmitted with the appropriate level of service. For example, the QoS scheduler 120 interfaces with the queuing block 105 to ensure that packet selection for dequeueing is done for both LL and SAF traffic, maintaining consistent QoS requirements across all queues. The unified enqueue/dequeue path for both types of packets (e.g., LL and SAF) may be accounted for by the admission control counters.

Previous implementations of the LL mechanism provided a separate dedicated path for LL, which required additional storage for LL packet cells and could not maintain QoS across the two traffic streams. The network switch 100, according to the subject technology, can switch from one path to the other while limiting the introduction of gaps that could impact throughput and latency. This configuration helps control latency and jitter by ensuring the timely processing and transmission of packets, particularly for real-time traffic such as voice and live video.

In some embodiments, the network switch 100 may be configured to allow packets queued in a destination queue to take the LL path when a queue backup is lower than a predetermined level. Specifically, the traffic manager can dynamically select different paths for packet forwarding depending on the congestion levels, or "queue backup," of the destination queues. A destination queue refers to a buffer in the switch where packets are temporarily stored before being transmitted to their destination port. Each destination queue corresponds to an output port or network path. Queue backup refers to the amount of data or number of packets waiting in a destination queue. A higher queue backup indicates more congestion, while a lower queue backup indicates less congestion. By allowing packets to take the LL path when the queue backup is low, the network switch can reduce the overall latency for these packets. This is especially beneficial for high-priority traffic that requires quick delivery.

In an embodiment, the network switch 100 may be configured to switch packets to the SAF path when delays due to the queue backup in the LL path are approximately equal to the latency of the SAF path. In another embodiment, the network switch 100 may be configured to switch packets back to the LL path when the queue backup is reduced. In yet another embodiment, the TM is configured to keep the packets in the LL path, at least temporarily, when multiple source ports send the packets to a given destination port no matter whether the packets are sent from front panel ports or auxiliary ports. This allows the traffic manager to be more resilient to temporary oversubscription and be packet source port agnostic (e.g., front panel vs auxiliary ports) when deciding to stay in the LL path.

In an embodiment, the TM may be further configured to track a selection of packets into the second path at a queue level. This refers to decision-making and tracking mechanisms tracking metrics such as queue depth (number of packets in the queue), queue backup (congestion level), and the priority of the traffic in the queue. The selection of packets for dequeue is done by the QoS scheduler 120 for both LL and SAF traffic, therefore the QoS requirement is maintained across queues. Both types of traffic are accounted for by the admission control counters ensuring no additional buffer carve out is needed for LL traffic. This TM can manage and monitor packet paths on an individual queue basis rather than on a broader port level. Each destination port in the switch can have multiple queues, each corresponding to different traffic classes or priorities. The TM can make independent decisions for each queue within a port, allowing for more precise control and optimization.

In an embodiment, the TM may allow higher-priority queues of a port with lower queue backup in the SAF path to be switched to the LL path even if lower-priority queues of the same port experience higher queue backup. In another embodiment, the TM may restrict lower-priority queues from using the second path if higher-priority queues cannot use the second path.

In some embodiments, each of the functional blocks in the network switch 100 (e.g., in FIG. 1) can be implemented in hardware using multiple advanced techniques. For example, application-specific integrated circuits are often used to make custom-designed chips tailored for specific networking functions including those in the network switch 100. Optionally, field-programmable gate arrays techniques provide reconfigurable hardware that can be programmed to perform complex packet processing tasks including packet check, admission control, enqueue/dequeue process, storage, cell accumulation, and quality-of-service scheduling, etc. Optionally, specialized processors designed for high-speed packet handling and routing may be used. Implementing these functions in hardware can help improve performance and reduce latency, which are often crucial for modern high-speed network switches.

FIG. 3 is a flow chart illustrating method 300 for managing packet latency in a traffic manager according to an embodiment of the subject technology. This diagram is merely an example and should not unduly limit the scope of the claims. One of ordinary skill in the art would recognize many variations, alternatives, and modifications. In some embodiments, the network switch 100 in FIG. 2 provides a traffic manager to execute method 300 for managing packet latency in high-speed (Ethernet) network communication. Method 300 comprises multiple different steps. These steps may not be limited to a certain order as shown in the flow chart. Some steps may be performed before or after others. Other steps may be inserted or removed depending on applications and network settings, including QoS requirements, priorities, resource availabilities, etc.

In an embodiment, method 300 includes step 302 for receiving a first data packet. The first data packet includes a header and a payload. For example, the term "payload" refers to the actual data being transported by a network packet, excluding any metadata or control information. The header includes at least a metadata comprising packet control information. For example, the term "metadata" refers to auxiliary data that accompanies a packet, providing information about the packet's contents, origin, destination, handling requirements, and/or processing instructions. The payload contains a plurality of cells which may be transmitted sequentially in time. For example, the term "cells" refers to small, fixed-size units into which a larger data packet is divided for more efficient handling and transmission over a network. Method 300 also includes step 304 for providing a first path and a second path for separately processing data packets based on certain criteria, such as priority levels or specific QoS requirements, predetermined for reducing network traffic latency. The first path is characterized by a first latency for packet processing. The second path is characterized by a second latency for packet processing. The first latency is lower than the second latency. Method 300 also includes step 306 for determining, using at least the metadata, an eligibility of directing the first data packet to the first path or otherwise directing the first data packet to the second path. By initiating the first path, some packet process delays during SAF packet processing in the second path, such as packet serialization delay, cell-control processing delay, and/or miscellaneous delays due to admission control, cell storage access, and QoS maintenance, can be bypassed saving multiple cycles of latency in the traffic manager. Quick processing and forwarding of high-priority traffic can help ensure that QoS requirements are met, providing a better experience for end-users. Early enqueuing helps manage congestion more effectively, as packets are processed and moved through the switch more quickly, freeing up buffer space for incoming traffic.

Method 300 also includes step 308 for starting to store the first data packet from the first path into a first queue upon receiving a first cell of the payload. This step allows the packets that are selected for the first path to be processed via a cut-through switching as soon as the start of the packet (referred as SoP) arrives, rather than waiting for the entire packet to be received as the packet processing in the second path. Immediately enqueuing the packet in the first path on SoP significantly reduces the time a bigger-sized packet spends in the switch, as processing starts right from the arrival of the first cell, leading to lower overall latency.

Method 300 also includes step 310 for holding the cells of the payload associated with the first queue in a first buffer. This step is executed in the traffic manager to manage the cells by temporally holding them in a small size data buffer while the header of the packet is being processed. Traffic manager examines packet headers and control information to determine if the packet meets the criteria to be an LL packet for low latency processing. Once it passes the eligibility check, the cells of the LL packet will be directed to the first buffer, by passing a big cell storage (second buffer) set for the SAF packet in the second path. This step ensures packets are stored in an orderly manner and implements various queuing disciplines like FIFO (First-In-First-Out), priority queuing, or weighted fair queuing.

Method 300 further includes step 312 for preparing a second data packet using the cells held in the first buffer. This step is executed by the packet deque and cell lookup block of the traffic manager to dequeue the packets from the queues. The cells of the first data packet will be retrieved from the queue in this step and reassembled into a second data packet. It also performs cell lookup operations to identify the next-hop destination and any necessary routing or forwarding actions to prepare the second data packet for transmission. Method 300 includes step 314 for transmitting the second data packet after it is prepared in step 312. This block ensures packets are forwarded to the identified destination port according to network policies and routing tables.

Alternatively, method 300 may include a step for accumulating all cells of the first data packet in the second path over a first delay before storing the first data packet in a second queue and holding the cells of the payload in a second buffer, wherein the first delay is bypassed by the first data packet in the first path. This step is to put those packets that have not been selected to the LL path to a store-and-forward path, where the packet processing follows a rule of the EOP process to require the packet to wait for all cells to arrive before enqueuing it into a destination queue. Method 300 may include a step for processing the cells of the payload with a second delay and holding the cells in a second buffer, wherein the second delay is bypassed by the first data packet in the first path.

In some embodiments, the method may further include a step for bypassing the second buffer by storing cells of the first data packet in the first buffer in the first path, wherein the first buffer comprises a smaller size than the second buffer, resulting in a faster access time in the first path. For the LL packet entering the first path, the cells of the packet can be bypassed (not stored in the big memory of a cell storage block) to a small storage in a first buffer associated with the dequeue block. The dequeue block in the first path can retrieve the cells via the cell lookup and reassemble them without the need to access the big memory of the cell storage block of the switch FIG. 4 is a flow chart illustrating method 400 for managing network traffic according to another embodiment of the subject technology. This diagram is merely an example and should not unduly limit the scope of the claims. One of ordinary skill in the art would recognize many variations, alternatives, and modifications. In some embodiments, the network switch 100 in FIG. 1 provides a traffic manager to execute method 400 for managing packet latency in high-speed (Ethernet) network communication. Method 400 comprises multiple different steps. These steps may not be limited to a certain order as shown in the flow chart. Some steps may be performed before or after others. Other steps may be inserted or removed depending on applications and network settings including QoS requirements, priorities, resource availabilities, etc.

In an embodiment, method 400 includes step 401 for providing a first path characterized by a relatively low first latency in packet processing and a second path characterized by a relatively high second latency. Additionally, method 400 may include step 403 for determining eligibility for multiple data packets having a same destination port to be directed in the first path upon determination of the first latency due to low queue backup in the first path. This step allows the traffic manager for managing network traffic to be more resilient to temporary oversubscription for the low latency path. Method 400 also includes step 405 for switching incoming data packets to the second path upon determination of the first latency due to high queue backup in the first path is approximately equal to the second latency. Further, method 400 includes step 407 for switching the incoming data packets back to the first path upon determining that the first latency due to congestion and loading is reduced. Furthermore, method 400 includes step 409 for utilizing a single enqueue/dequeue path for the data packets in both the first path and the second path.

In some embodiments, the method may include selecting data packets from both the first path and the second path for dequeue by a quality of service (QoS) scheduler, thereby maintaining QoS requirements across queues. The method also includes accounting for the network traffic in both the first path and the second path using admission control counters, thereby eliminating the need for allocating additional buffers for the first path.

In some embodiments, the method may further include allowing the data packets to stay in the first path upon determination of the data packets to a given destination port being sent from multiple source ports. The method also includes tracking a selection of packets into the first path at a queue level. In some other embodiments, the method may include allowing higher-priority queues of a port with lower queue backup in the second path to switch to the first path even if lower-priority queues of the same port experience higher queue backup. The method may also include restricting lower-priority queues from using the first path if higher-priority queues cannot use the first path.

While the above is a full description of the specific embodiments, various modifications, alternative constructions, and equivalents may be used. Therefore, the above description and illustrations should not be taken as limiting the scope of the present invention which is defined by the appended claims.

What is claimed is:

1. A network switch comprising:
an input port configured to receive a first data packet, the first data packet comprising a header and a payload, the header comprising a metadata, the payload comprising a plurality of cells;
a controller configured to determine, using at least the metadata, an eligibility of directing the first data packet to a first path or otherwise directing the first data packet to a second path, the first path being characterized by a first latency, the second path being characterized by a second latency, the first latency being lower than the second latency;
a first processor configured to cause storing the first data packet from the first path into a first queue upon receiving a first cell of the payload;
a first buffer configured in the first path to hold the plurality of cells of the payload associated with a queue;
a second processor configured to manage the first data packet in the first queue;
a third processor configured to retrieve the cells from the queue to prepare a second data packet; and an output port configured to transmit the second data packet upon an identification of a destination port;
wherein the controller is further configured to keep packets in the first path when multiple source ports send the packets to a given destination port no matter whether the packets are sent from front panel ports or auxiliary ports.

2. The network switch of claim 1, further comprising a fourth processor configured in the second path to accumulate cells of the first data packet over a first delay before forwarding the first data packet to the first processor to be enqueued in a second queue.

3. The network switch of claim 2, wherein the fourth processor is further configured to process the cells of the payload with a second delay and hold the cells in a second buffer.

4. The network switch of claim 3, wherein the first buffer is characterized by a smaller size relative to the second buffer to provide a faster access time for the first path.

5. The network switch of claim 1, wherein the controller comprises admission control counters coupled to the first processor for accounting for data packets in the first path and the second path.

6. The network switch of claim 1, wherein the controller is configured to:
determine the eligibility for packets in a destination queue to take the first path when queue backup is lower than a predetermined level;
determine the first latency due to the queue backup is approximately equal to the second latency to direct the packets to the second path; and
determine the first latency due to the queue backup being reduced to switch the packets back to the first path.

7. The network switch of claim 1, wherein the first processor, the second processor, and the third processor are configured as single enqueue and dequeue paths for packets in both the first path and the second path.

8. The network switch of claim 7, further comprising:
a scheduler coupled to the second processor and configured to select packets from both the first path and the second path to dequeue in the single enqueue/dequeue path to help satisfy quality of service (QoS) requirements across queues.

9. The network switch of claim 1, wherein the controller is further configured to:
monitors selections of data packets into the first path at a queue level;
allow higher-priority queues of a port with lower queue backup in the second path to be switched to the first path even if lower-priority queues of the same port experience higher queue backup; and
restrict lower-priority queues from using the first path if higher-priority queues cannot use the first path.

10. A method for managing network traffic to reduce latency comprising:
receiving a first data packet, the first data packet comprising a header and a payload, the header comprising a metadata, the payload comprising a plurality of cells;
providing a first path and a second path, the first path being characterized by a first latency, the second path being characterized by a second latency, the first latency being lower than the second latency;
determining, using at least the metadata, an eligibility of directing the first data packet to the first path or otherwise directing the first data packet to the second path;

starting to store the first data packet from the first path into a first queue upon receiving a first cell of the payload;
holding the cells of the payload associated with the first queue in a first buffer;
preparing a second data packet using the cells held in the first buffer;
allowing packets to stay in the first path when multiple source ports send the packets to a given destination port; and
transmitting the second data packet.

11. The method of claim 10, further comprising:
accumulating all cells of the first data packet in the second path over a first delay before storing the first data packet in a second queue and holding the cells of the payload in a second buffer, wherein the first delay is bypassed by the first data packet in the first path; and
processing the cells of the payload with a second delay and holding the cells in a second buffer, wherein the second delay is bypassed by the first data packet in the first path.

12. The method of claim 11, further comprising bypassing the second buffer by storing cells of the first data packet in the first buffer in the first path, wherein the first buffer comprises a smaller size than the second buffer, resulting in a faster access time in the first path.

13. A method for managing network traffic comprising:
providing a first path and a second path, the first path being characterized by a first latency, the second path being characterized by a second latency, the first latency being lower than the second latency;
determining eligibility for multiple data packets having a same destination port to be directed in the first path upon determination of the first latency due to low queue backup in the first path;
switching incoming data packets to the second path upon determination of the first latency due to high queue backup in the first path is approximately equal to the second latency;
switching the incoming data packets back to the first path upon determination of the first latency due to congestion and loading is reduced;
allowing the data packets to stay in the first path upon determination of the data packets to a given destination port being sent from multiple source ports no matter whether they are front panel ports or auxiliary ports; and
utilizing a single enqueue/dequeue path for the data packets in both the first path and the second path.

14. The method of claim 13, further comprising selecting data packets from both the first path and the second path for dequeue by a scheduler for maintaining quality of service (QoS) requirements across queues.

15. The method of claim 13, further comprising accounting for the network traffic in both the first path and the second path using admission control counters, thereby eliminating the need for allocating additional buffers for the first path.

16. The method of claim 13, further comprising tracking a selection of data packets into the first path at a queue level.

17. The method of claim 13, further comprising allowing higher-priority queues of a port with lower queue backup in the second path to switch to the first path even if lower-priority queues of the same port experience higher queue backup.

18. The method of claim 13, further comprising restricting lower-priority queues from using the first path if higher-priority queues cannot use the first path.

\* \* \* \* \*